United States Patent [19]
Emery

[11] Patent Number: 6,042,169
[45] Date of Patent: Mar. 28, 2000

[54] NESTING BEDLINER WITH RELIEVED FRONT WALL

[75] Inventor: Phillip L. Emery, Portage, Wis.

[73] Assignee: Penda Corporation, Portage, Wis.

[21] Appl. No.: 09/083,494

[22] Filed: May 22, 1998

Related U.S. Application Data

[63] Continuation-in-part of application No. 08/462,622, Jun. 5, 1995, Pat. No. 5,755,481.

[51] Int. Cl.⁷ ..................................................... B60R 13/01
[52] U.S. Cl. .......................................... 296/39.1; 296/39.2
[58] Field of Search ................................ 296/39.1, 39.2; 105/423

[56] References Cited

U.S. PATENT DOCUMENTS

| | | |
|---|---|---|
| 1,916,344 | 7/1933 | Thoms et al. ............................. 105/423 |
| 4,279,439 | 7/1981 | Cantieri . |
| 4,333,678 | 6/1982 | Munoz et al. . |
| 4,575,146 | 3/1986 | Markos . |
| 4,592,583 | 6/1986 | Dresen et al. . |
| 4,750,776 | 6/1988 | Barben . |
| 4,779,752 | 10/1988 | Vallee et al. . |
| 4,801,169 | 1/1989 | Queen et al. . |
| 4,890,874 | 1/1990 | Davis . |
| 4,986,590 | 1/1991 | Patti et al. ............................. 296/39.2 |
| 4,991,899 | 2/1991 | Scott . |
| 5,207,472 | 5/1993 | Gower . |
| 5,221,119 | 6/1993 | Emery . |

*Primary Examiner*—Dennis H. Pedder
*Attorney, Agent, or Firm*—Lathrop & Clark LLP

[57] ABSTRACT

A thermoformed thermoplastic truck bedliner has a front wall which is integral with and upstanding from a bottom wall. Side walls extend on either side of the front wall and also extend upwardly from the bottom wall. Relieved upwardly extending slots are cut in the bedliner between portions of the side walls and the front wall, to allow the upper portions of the side walls to fold or bend outwardly away from the front wall, thereby permitting improved nestability in a stack of like bedliners. The slots may be cut down to about the level of the wheel well covers, and may be formed in the front wall alone, or in the side walls. Inwardly extending portions of the side walls may be molded with outwardly extending portions of the side walls, such that when the slot is cut, the two portions of the side wall may be folded toward one another to overlap the portions and fully shield the truck bed. Similar structure may be formed in the front wall, and the bedliners may be of the under the rail, or over the rail type. In addition, foldable corners may be molded between the front and side walls, portions of the corners overlapping when the bedliner is installed within a truck bed.

12 Claims, 4 Drawing Sheets

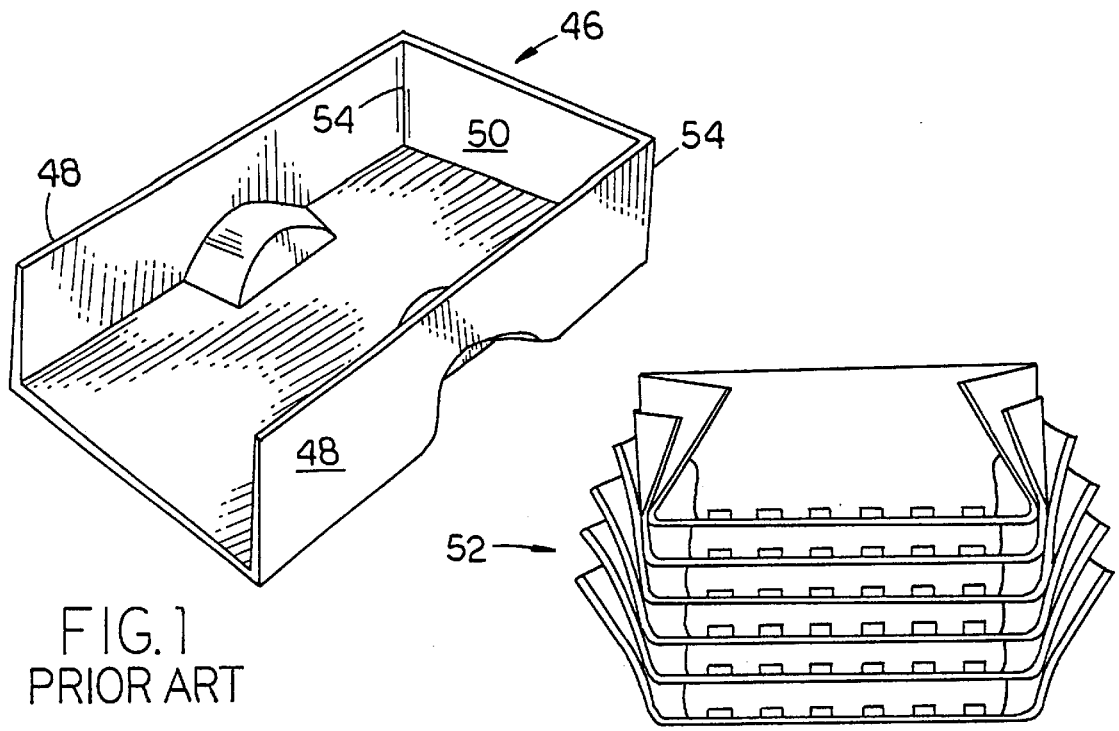
FIG. 1
PRIOR ART
FIG. 2
PRIOR ART
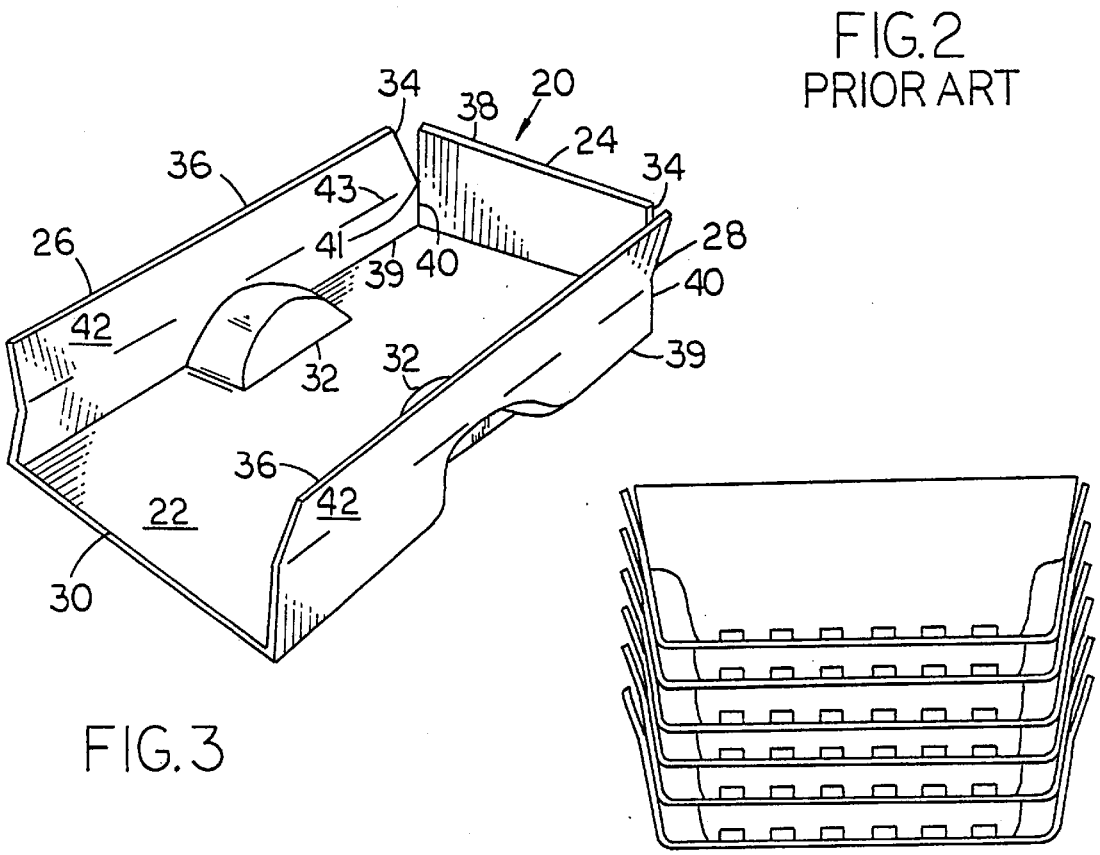
FIG. 3
FIG. 4

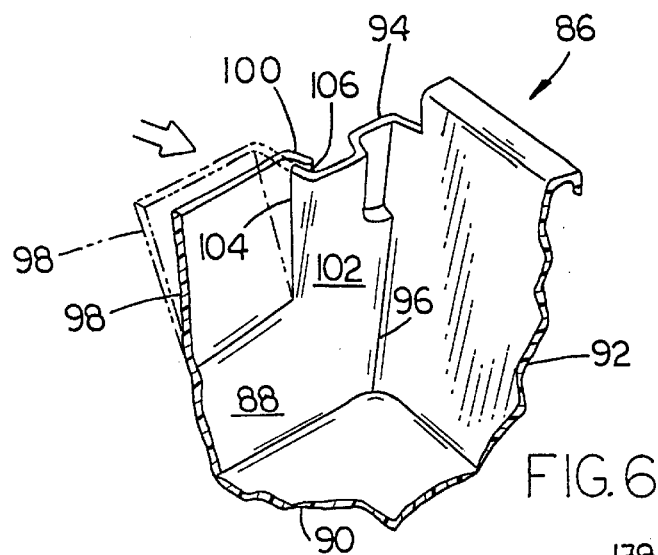
FIG. 6
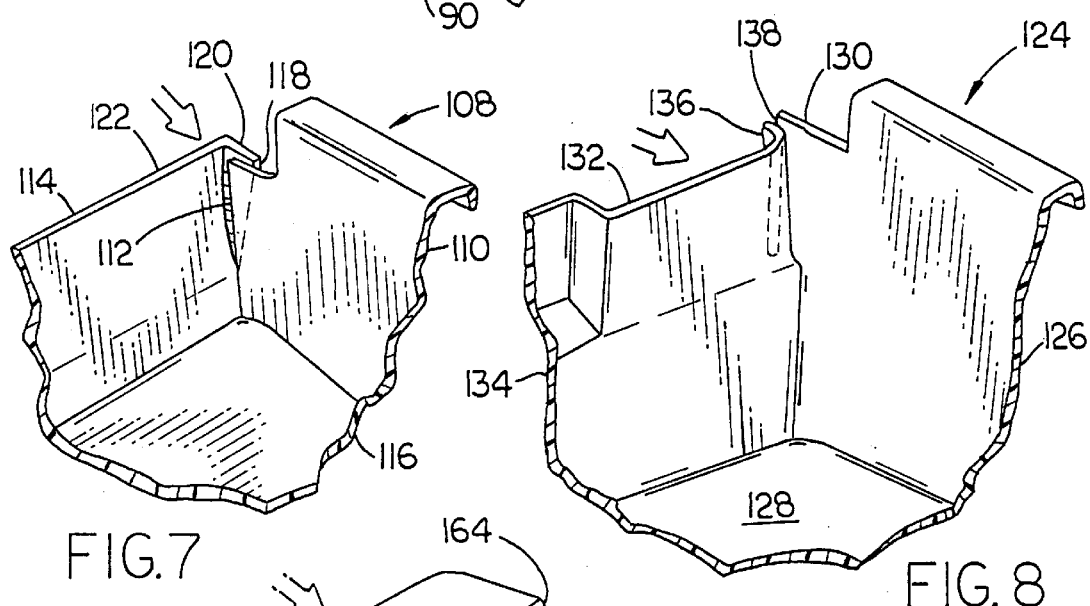
FIG. 7
FIG. 8
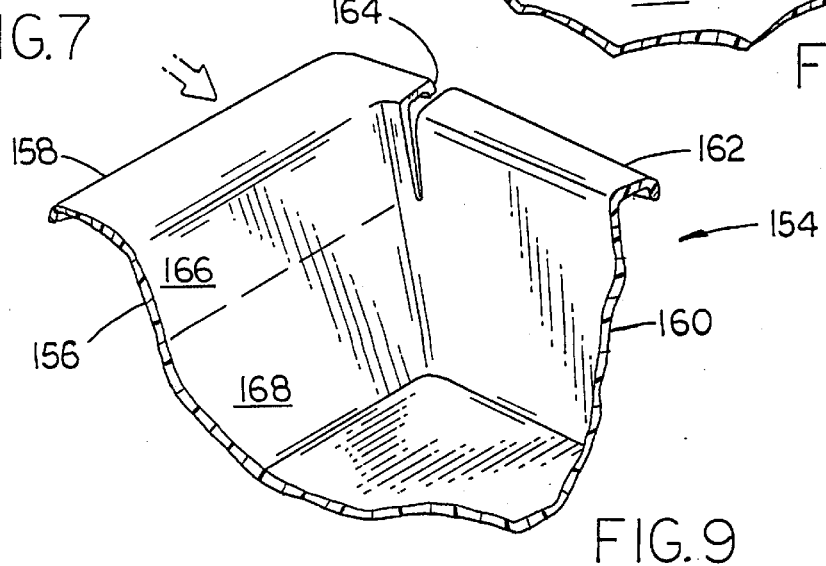
FIG. 9

NESTING BEDLINER WITH RELIEVED FRONT WALL

CROSS REFERENCE TO RELATED APPLICATIONS

This application is a continuation-in-part of application Ser. No. 08/462,622 filed on Jun. 5, 1995 now U.S. Pat. No. 5,755,481, the disclosure of which is incorporated by reference herein

BACKGROUND OF THE INVENTION

The present invention relates to thermoformed thermoplastic truck bedliners.

The pickup truck is an extremely popular vehicle, not only for commercial and trade applications, but also as a personal vehicle. The truck bed is commonly formed of painted steel, the exposed surfaces of which are prone to scratching, denting and corrosion when brought into contact with tools, cargo, lumber, dunnage, and the wide assortment of items which a driver may choose to carry in the bed. Thermoplastic bedliners have found wide acceptance as an economical and attractive way to shield the metal surfaces of the truck bed from potentially damaging contact. Of course, the modern molded thermoplastic bedliner will often do more than just protect the surface of the bed, but will offer cavities and projections which assist in load restraint, cargo carrying and bed division.

Commonly formed by single sheet thermoforming processes, thermoplastic bedliners present a high value per unit weight, especially when their great length and width are taken into consideration. On the other hand, the volume encompassed by a bedliner is large compared to its weight, which makes single unit shipments prohibitively expensive under most circumstances. As a result, after manufacture, bedliners are stored, warehoused, shipped, and maintained at the retailer in stacks, with a significant quantity of like bedliners nested one within another. By receiving one upwardly opening bedliner within another, the vertical height of the stacked bedliners can be minimized.

Nevertheless, the conventional bedliner has a bottom wall with two parallel side walls which are open at the rear of the truck bed, and which are connected at the front of the bed by a front wall which runs perpendicular to the side walls. When multiple bedliners of this construction are nested, there can be a progressive tendency toward distortion of the plastic as the stack grows higher. Distorted bedliner side walls are unsightly, and are unappealing to the consumer. In addition, the tight fit of the bedliners near the front wall-side wall juncture, makes close nesting in that region difficult, with the result that successive bedliners in a stack are displaced further and further rearward. Not only does this rearward "kick-back" extend the length, and hence the shipping volume of the stack, it also tends to move the stack center of mass rearward, detracting from the stability of the stack. Stability is a concern not only in storage, but also when the stack is lifted and moved, for example by a forklift truck.

What is needed is a truck bedliner which can nest closely, but which can be readily assembled for side wall protection within a truck bed.

SUMMARY OF THE INVENTION

The thermoformed thermoplastic truck bedliner of this invention has a front wall which is integral with and upstanding from a bottom wall. Side walls extend on either side of the front wall and also extend upwardly from the bottom wall. Relieved upwardly extending slots are cut in the bedliner between portions of the side walls and the front wall, to allow the upper portions of the side walls to fold or bend outwardly away from the front wall, thereby permitting improved nestability in a stack of like bedliners. The slots may be cut down to about the level of the wheel well covers, and may be formed in the front wall alone, or in the side walls. Inwardly extending portions of the side walls may be molded with outwardly extending portions of the side walls, such that when the slot is cut, the two portions of the side wall may be folded toward one another to overlap the portions and fully shield the truck bed. Similar structure may be formed in the front wall, and the bedliners may be of the under-the-rail or over-the-rail type. In addition, accordion fold corners may be molded between the front and side walls, portions of the corners overlapping when the bedliner is installed within a truck bed.

It is an object of the present invention to provide a truck bedliner with minimal stacking interference in the forward corners of the bedliner.

It is a further object of the present invention to provide a truck bedliner which is closely nestable in a stack.

It is another object of the present invention to provide a truck bedliner which may be nested with like bedliners with minimal or no separators.

It is an additional object of the present invention to provide a truck bedliner which has side walls which closely conform to the truck bed side walls for increased cargo capacity.

It is another object of the present invention to provide a truck bedliner which provides improved access to truck side wall features such as cargo tie-downs and board slots.

Further objects, features and advantages of the invention will be apparent from the following detailed description when taken in conjunction with the accompanying drawings.

BRIEF DESCRIPTION OF THE DRAWINGS

FIG. 1 is an perspective view of a prior art truck bedliner.

FIG. 2 is a schematic view of a stacked array of a number of the prior art bedliners of FIG. 1.

FIG. 3 is a perspective view of a bedliner with relieved forward corners of this invention.

FIG. 4 is a schematic view of a stacked array of a number of the bedliners of FIG. 3.

FIG. 6 is a fragmentary isometric view of another alternative embodiment is bedliner of this invention, with the pivotal upper portions of the side wall shown in phantom view.

FIG. 7 is a fragmentary isometric view of a further alternative embodiment bedliner of this invention.

FIG. 8 is a fragmentary isometric view of a still further alternative embodiment bedliner of this invention.

FIG. 9 is a fragmentary isometric view of yet another alternative embodiment bedliner of this invention, of the type known as an over-the-rail bedliner.

DESCRIPTION OF THE PREFERRED EMBODIMENTS

Figure 5:
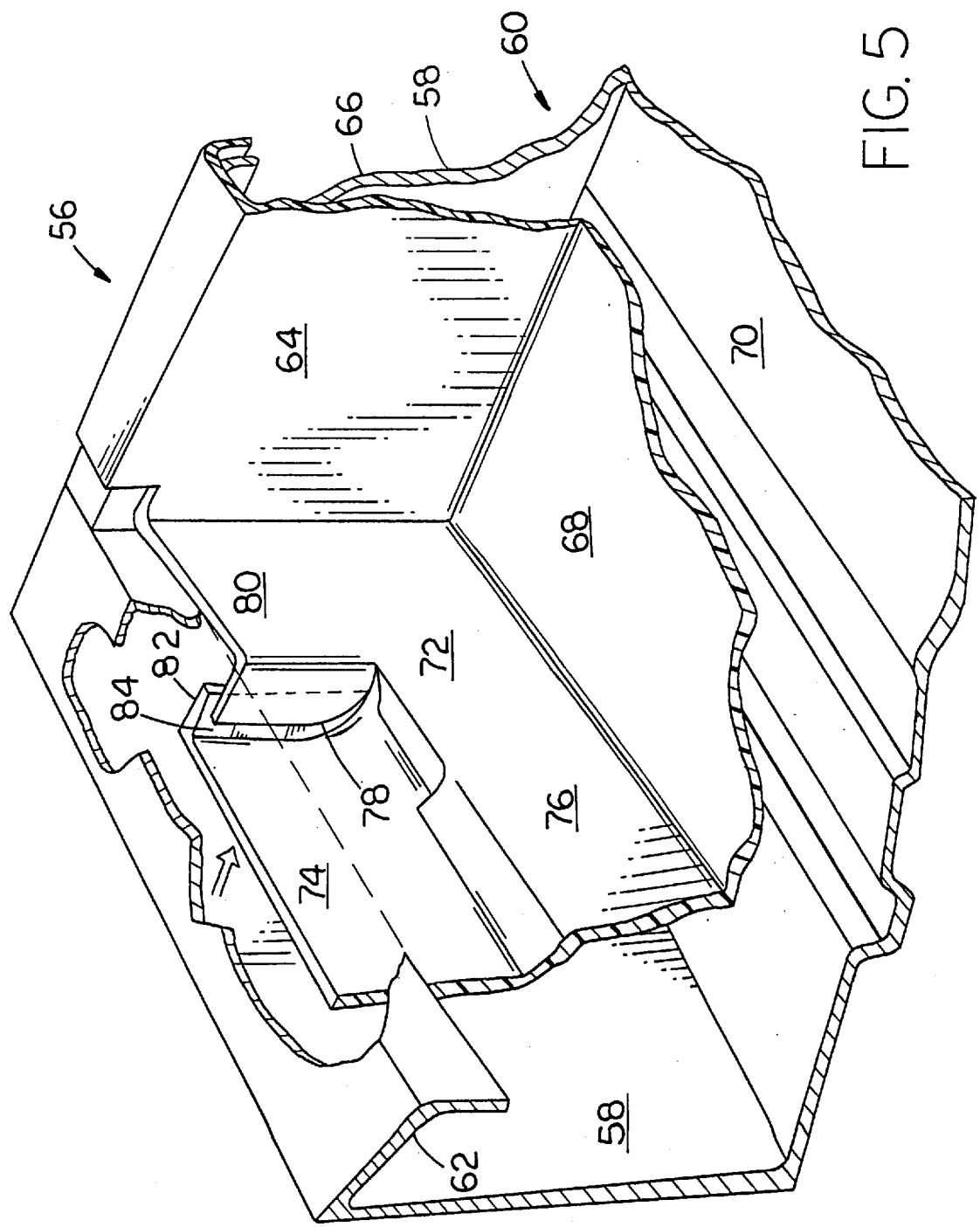
FIG. 5 is a fragmentary isometric view of an alternative embodiment bedliner of this invention positioned within a pickup truck box.

Referring more particularly to FIGS. 1–11, wherein like numbers refer to similar parts, a thermoformed thermoplastic pickup truck bedliner 20 of this invention is shown in FIG. 3. The bedliner 20 has a bottom wall 22 which extends generally horizontally along the floor of a pickup truck. A front wall 24 is integral with the bottom wall and extends upwardly from the bottom wall adjacent the front wall of the truck bed. A first side wall 26 is also integrally formed with the bottom wall 22, and extends upwardly from the bottom wall alongside a side wall of the truck bed. A second side wall 28 is integrally formed with the bottom wall and extends upwardly from the bottom wall approximately parallel to the first side wall 26. The first side wall 26 is spaced from the second side wall 28 at the rear of the bedliner 20, and the two side walls and the bottom wall define a rear opening 30 at the rear of the bedliner, the rear opening being typically closed by the pickup truck tail gate, or by a net or the like.

The bedliner 20 is preferably formed from thermoplastic material such as polyethylene in the single sheet thermoforming process, in which a heated sheet of thermoplastic material is drawn into a vacuum forming mold, where it is cooled and a desired shape is imposed upon it. The formed part is then removed from the mold and trimmed or cut, typically by manual or automatically controlled routers, to produce the finished bedliner.

The side walls 26, 28, are stiffened with respect to the bedliner bottom wall 22 by molded wheel well covers 32 which extend between an elevated portion of each side wall and an inwardly spaced portion of the bottom wall. Above the level of the wheel well covers 32, however, the side walls are permitted to bend outwardly, away from the interior of the bedliner. This outward bending is facilitated by upwardly extending slots 34 defined between the front wall 24 and the side walls. The slots 34 may extend to within close proximity of the bottom wall 22, but in a preferred embodiment, the slot terminate at approximately the elevation of the tops of the wheel well covers 32. The side walls 26, 28 have lower portions which extend from the front wall 24 at approximately right angles, and which are integral with the front wall. A flexure point 41 is defined as the highest portion of the rigid corner 40, at the point where the slot 34 begins. The upper portion 42 of each side wall flexes or hinges about a hinge line 43 which is substantially parallel with the bottom wall and which passes approximately through the flexure point 41. The side wall upper portion is hence not constrained to form a rigid corner with the front wall.

Each side wall has an upper edge 36 which defines the upper level of the side wall. The front wall 24 may have an upper edge 38 as well, which is at approximately the same level as the side wall upper edges 36, but is nowhere continuous or adjacent the upper edge of the side walls. As shown in FIG. 3, the discontinuity between the side walls and the front wall 24 greatly improves the nestability of stacked bedliners 20. The bedliner has improved ability to give at the juncture of the front wall and the side walls in the vicinity of the cab, because the vertical slots 34 offer relief Moreover, the more rigid forward corners 40 of the bedliner, because they do not extend the full height of the front wall, do not impart as much resistance to flexing as the prior art bedliner. Although the upper portions 42 of the side walls have been illustrated in FIG. 3 in an outwardly flexed condition, it should be noted that the side walls may be formed in an orientation which is not flexed outwardly, or, alternatively, the upper portions can be formed with an outward inclination with a reliance on the engagement of the truck box side wall to return the upper portions to their desired orientation when installed.

It should be noted that no distinct hinge line structure need be provided midway up the side walls, as the outward bending of the upper portions 42 of the side walls can take place gradually, thereby reducing the possibility for plastic deformation or damage to the side walls. The outward bending of the side wall upper portions 42, however, contributes significantly to the closeness with which the bedliners 20 may be stored in a stack 44. Not only can the bedliners be placed vertically close to one another, thereby decreasing the total height required to store a given number of bedliners, but because the tight fit at the forward corners is eliminated, the bedliners can be positioned close to one another in the front to rear direction, reducing the total length of the stack 44 and again reducing total shipping or storage volume.

As shown in FIGS. 1 and 2, a conventional bedliner 48 with side walls 46 which are fully joined to the front wall 50, can be distorted when stored in a stacked nested array 52. Not only that, but the tight fit at the forward corners 54 of the prior art bedliner can lead to wedging of one bedliner within another in a "stack jam," which can result in damage to bedliners, or can interfere with the ready removal of one bedliner from the stack. A typical stack may include dozens of bedliners, closely nested one within another. A common manifestation in some bedliner designs, illustrated schematically in FIG. 2, is the deformation of the side walls of the bedliner, wherein the rearward portions of the side wall are less inhibited in their pivoting than the forward portions of the side wall, which are stiffened by their connection all along the forward corner to the front wall. In some cases the forward portions of the side walls of bedliners near the bottom of the stack will be deformed outwardly, while the forward portions of the side walls near the top of the stack will be deformed inwardly. In any event, the twisting and warping of the side wall which results from such stack deformation may impart a permanent deformation to the bedliner which may detract from its fit and appearance within a truck bed.

Because of the outward flexibility of the side walls in the bedliner 20, structure such as tie-down access holes and board holding slots present reduced barriers to nesting. In addition, the need for wooden slats or boards to serve as separators between the stacked bedliners is reduced or eliminated. The separators are needed in the prior art bedliner 48 to prevent stack jam, but if the walls are sufficiently relieved, the possibility of stack jam is avoided, even with no separators at all. Whereas in the prior art bedliner 48 the side walls are rigidly connected to the front wall, the possibility of stack jam is increased unless extreme draft angle is molded in, the side walls 26, 28 of the bedliner 20 are disconnected from one another along the slots 34, thereby being left free to create their own draft.

Although the slots 34 may be formed as a single router cut along the forward corners 40, as shown in FIG. 3, the slots may preferably be formed as U-shaped router paths extending along portions of the side walls and the front wall.

Where desired for cosmetic and protective purposes, the bedliner of this invention may be provided with structure which avoids a through gap in the bedliner which exposes the shielded truck bed, as shown in FIGS. 5–11.

The bedliner 56, shown in FIG. 5, is of the type known as an "under-the-rail" bedliner. Under-the-rail bedliners have side walls which extend outwardly toward the side walls 58 of the truck box 60 and which do not overlie the side rails 62 of the truck box. The bedliner 56 has a front wall 64 which extends along the front wall 66 of the truck box 60, and a bottom wall 68 which extends along the bottom wall 70 of the truck box. The bedliner 56 has two main positions, a shipping and storage position in which greater nestability is offered, and an installed position, in which usable interior truck box volume is the goal. The side walls 72 of the bedliner 56 extend upwardly from the bottom wall 70, and adjoin the front wall 64 approximately perpendicularly to the front wall.

A side wall upper portion 74 extends upwardly along the side wall 72, and extends outwardly from the lower portion 76 of the side wall as it extends upwardly. The upper portion 74 will generally begin at a vertical position at or above the level of the wheel well cover, not shown. A front tab 78 extends sidewardly and outwardly from a front segment 80 of the side wall 72. The front tab 78 is substantially parallel to the front wall 64, and, in the as-molded condition, the front tab 78 is continuous with a side tab 82 which extends from the side wall 72. When removed from the mold, a slot 84 is cut between the side tab 82 and the front tab 78. The slot 84 permits the now distinct front tab 78 and side tab 82 to pivot from a flexure point with respect to one another as the upper portion 74 of the side wall is bent outwardly in shipping or storage when another bedliner is stacked on top of it. However, when the bedliner 56 is installed within a truck box, the side wall 58 of the truck box will engage against the upper portion 74 and force it to pivot inwardly, causing the front tab 78 and the side tab 82 to overlap, and thereby substantially close the slot 84. The overlapped tabs 78, 82, usually formed of a dark colored plastic, visually obscure the slot, and prevent direct view of the truck box side wall behind the bedliner through the slot.

An alternative embodiment bedliner 86, shown in FIG. 6, has a side wall 88 which extends upwardly from a bottom wall 90 and rearwardly from a front wall 92. The bedliner 86 differs from the bedliner shown in FIG. 5, in that it has additional structure 94 at the forward corner 96 which provides space for the insertion of a stake in the overlying stake pocket of the truck box. The as-molded condition of the side wall 88 upper portion 98 with side tab 100 and the front portion 102 of the side wall 88 with front tab 104 is shown in phantom view in FIG. 6. A slot 106 is cut in the molded part, to separate the front tab 104 from the side tab 100, and permit the pivoting of the two segments with respect to one another to enable the outward bending of the side wall upper portion when stacked and to thereby improve nesting, while allowing the tabs to overlie one another when installed in a truck box to obscure the side wall of the truck box from view.

The alternative embodiment bedliner 108, shown in FIG. 7, has a front wall 110 with a front tab 112 which extends not only parallel to the front wall, but also coplanar with the front wall. The side wall 114 extends upwardly from the bottom wall 116 and adjoins the front wall 110 at a right angle. A slot 118 is cut along the front wall 110 to define a wedge-shaped side tab 120 which extends from the upper portion 122 of the side wall 114. While the side tab 120 is continuous with the front wall in the as-molded condition, once the slot 118 is formed, the side tab 120 is free to pass behind the front wall, and allow the upper portion 122 of the side wall to be pivoted by engagement against the side wall of the truck box.

Where obscuring the sight lines from the interior of the bedliner to the side walls of the truck box is of key concern, it is not necessary that the bedliner structure block actual access to the truck bed. For example, as shown in the bedliners of FIGS. 8 and 10, a gap may remain between the tabs while the tabs still visually obstruct a direct view of the truck box.

The bedliner 124, shown in FIG. 8, has a front wall 126 which extends upwardly from a bottom wall 128, and which has a front tab 130 which is coplanar with the front wall, yet which extends sidewardly and outwardly beyond the plane of the upper portion 132 of the side wall 134, when the bedliner is installed within a truck box. The side tab 136 which extends from the upper portion 132 of the side wall 134 extends outwardly from the side wall, and is parallel to and spaced rearwardly from the front wall 126. The front tab 130 and the side tab 136 are not formed as a continuous coplanar segment, but are instead formed as opposite facing walls of vertically extending U-shaped structure. After molding, the base of the U is cut or routed off, leaving a slot 138 defined between the two tabs which permits the upper portion 132 of the side wall 134 to pivot outwardly or inwardly, facilitating nesting and close conformity of the bedliner to the truck box. Because of the placement of the slot 138 on the side wall, viewers will rarely be in a position to see directly head on into the slot.

Figure 10:
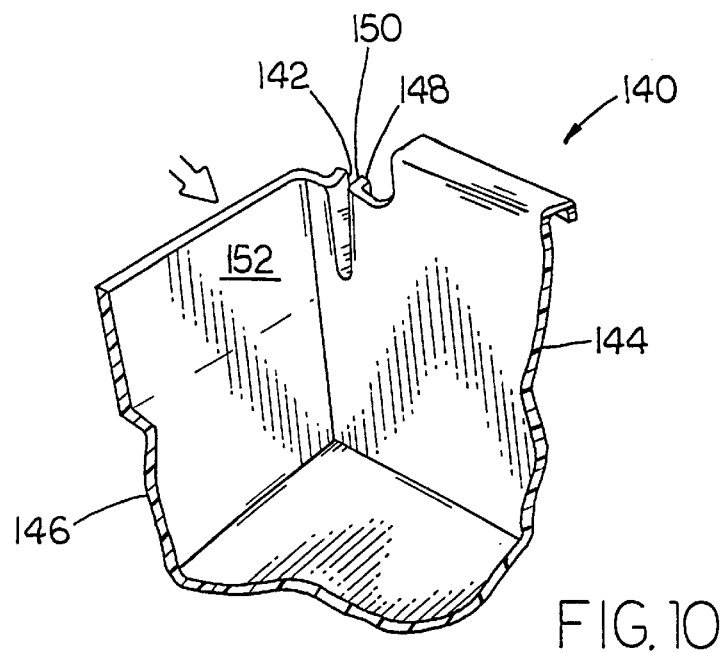
FIG. 10 is a fragmentary isometric view of still another alternative embodiment bedliner of this invention.

The alternative embodiment bedliner 140 shown in FIG. 10, has a side tab 142 which is formed on the front wall 144 and which extends approximately parallel to the side wall 146 and to the front wall front tab 148. A slot 150 is defined between the side tab 142 and the front tab 148. Although the slot 150 is on the front wall, the relief will still permit an outward flexing of the upper portions 152 of the side walls 146 to improve nestability of the bedliners 140.

An alternative embodiment bedliner 154 which is an over-the-rail bedliner is shown in FIG. 9. The bedliner 154 has a side wall 156 with an outwardly extending lip 158 which overlies the side rail of a truck bed. The front wall 160 of the bedliner 154 also has a lip 162 which extends frontwardly to overlie the front rail of the truck box. A slot 164 is formed in portions of the front wall 160 and the front lip 162. The upper portion 166 of the side wall 156 is formed to be inclined outwardly from the lower portion 168 of the side wall, such that when the bedliner 154 is placed within a truck box, the upper portions 166 of the bedliner are pivoted inwardly to close up the slot 164.

Figure 11:
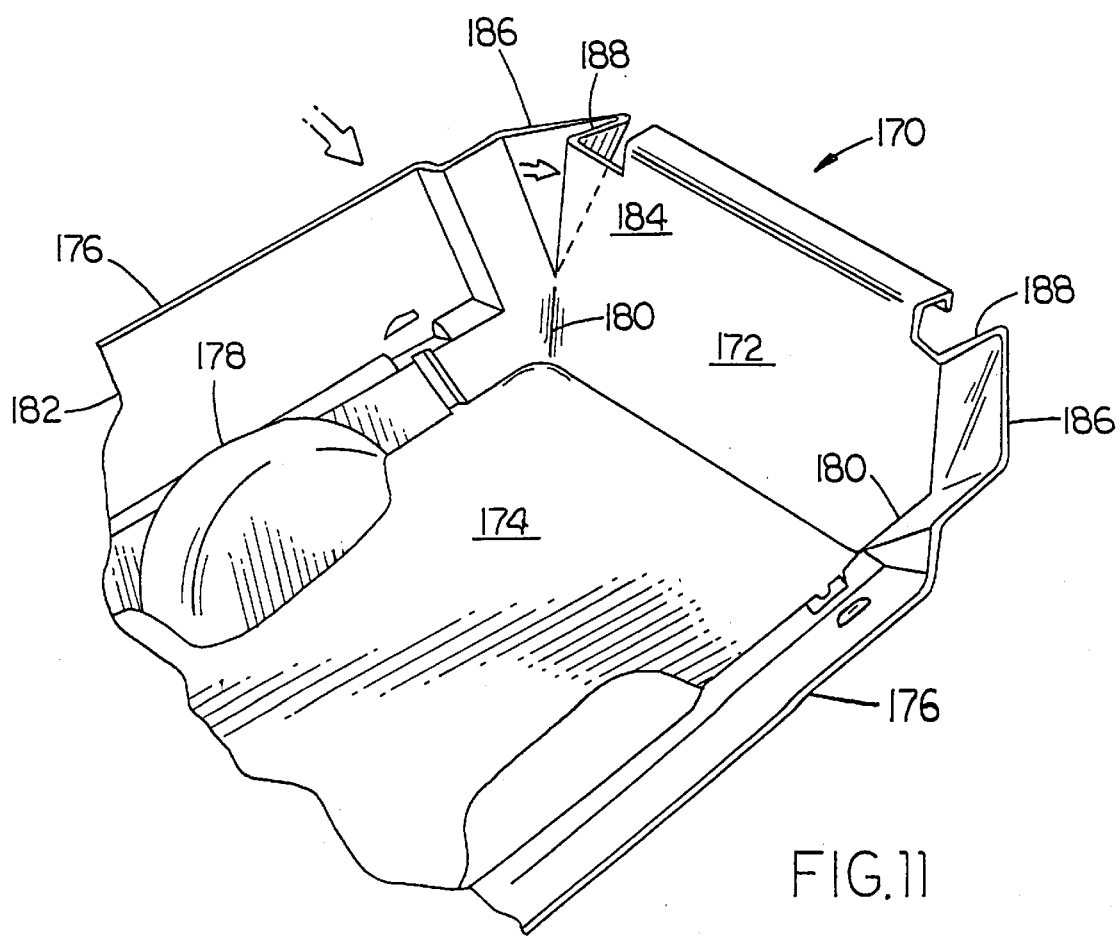
FIG. 11 is a fragmentary isometric view of an alternative embodiment bedliner of this invention, in which the side walls are connected to the front wall by collapsible webs which fold out of sight when the bedliner is installed within a truck box.

As shown in FIG. 11, an alternative bedliner 170 may be formed without the need for vertical slots. The bedliner 170 has a front wall 172 which extends upwardly from a bottom wall 174. The side walls 176 extend rearwardly from the front wall 172, and extend at right angles to the front wall for a distance approximately the height of the wheel well covers 178 at the forward corners 180 of the bedliner. The side wall upper portions 182 are molded in an outwardly inclined orientation, and are connected to an upper portion 184 of the front wall 172 by a first wedge-shaped segment 186 and a second wedge-shaped segment 188. The wedge-shaped segments extend from a flexure point and are formed along hinging lines which permit the wedge-shaped segments to be folded behind the front wall when the bedliner is inserted within a truck bed.

The first wedge-shaped segment 186 and the second wedge-shaped segment 188 extend frontwardly from the front wall 172. The side walls 176 are pivotable toward the front wall to bring the first wedge-shaped segment into closer proximity with the second wedge-shaped segment to thereby allow the gap between the upper portions of the side walls and the front wall to be obscured by the plastic of the wedge segments. The two wedge-shaped segments thus form an accordion fold.

The bedliners of this invention may be provided with various additional structure to enhance the performance of the bedliner at the forward corners, and to provide additional protective and decorative shielding capacity.

It should be noted that the bedliner of this invention although having improved nesting capabilities in multiple embodiments, will show especially desirable performance, when employed with bedliners provided with protruding or recessed side wall structure such as board holders, and tie-down access cavities. Such structure is well known to the art. Examples of side wall structure are shown in my prior U.S. Pat. No. 5,720,507 and my copending U.S. patent application No. 08/584,992, the disclosures of which are incorporated by reference herein. For clarity and simplicity in the drawings, such side wall structure has not been illustrated in most cases.

It is understood that the invention is not limited to the particular construction and arrangement of parts herein illustrated and described, but embraces such modified forms thereof as come within the scope of the following claims.

I claim:

1. A unitary thermoplastic bedliner for use in the cargo bed of a truck, the bedliner comprising:

a bottom wall;

a first side wall which extends upwardly from the bottom wall, the first side wall having an upper edge;

a first side lip which extends sidewardly outwardly from the upper edge of the first side wall;

a first wheel well cover which extends from the first side wall to the bottom wall, the first wheel well cover extending from a position elevated on the first side wall to a position on the bottom wall spaced inwardly from the first side wall, the first wheel well cover assisting in maintaining the first side wall in an upright orientation with respect to the bottom wall;

a second side wall which is spaced approximately parallel to the first side wall, the second side wall having an upper edge;

a second side lip which extends sidewardly outwardly from the upper edge of the second side wall;

a second wheel well cover which extends from the second side wall to the bottom wall, the second wheel well cover extending from a position elevated on the second side wall to a position on the bottom wall spaced inwardly from the second side wall, the second wheel well cover assisting in maintaining the second side wall in an upright orientation with respect to the bottom wall;

a front wall which extends upwardly from the bottom wall, the front wall having an upper edge, and the front wall being positioned between the first side wall and the second side wall;

a front lip which extends frontwardly from the upper edge of the front wall;

portions of the front wall which define two vertically extending slots which extend below the level of the front wall upper edge, one slot being positioned between portions of the front wall and the first side wall, and one slot being positioned between the portions of the front wall and the second side wall, such that the first side wall upper edge is not continuous with the front wall upper edge, and the second side wall upper edge is not continuous with the front wall upper edge, the first side wall and the second side wall thereby defining portions which are bendable outwardly from the front wall, thereby permitting increased nestability of one bedliner within a like bedliner, wherein each side lip extends continuously with a portion of the front lip along the upper edge of the front wall, and wherein the slots extend through the front lip, to permit the upper portions of the side walls and the side lips to be pivoted inwardly to close the slot when the bedliner is installed within a truck bed.

2. A unitary thermoplastic bedliner for the bed of a truck, the bedliner comprising:

a bottom wall;

a front wall which extends upwardly from the bottom wall;

a first side wall which extends upwardly from the bottom wall;

a second side wall which extends upwardly from the bottom wall;

a first wedge-shaped segment connected to the first side wall; and a second wedge-shaped segment connected between the first wedge shaped segment and the front wall, wherein the first wedge-shaped segment and the second wedge-shaped segment extend frontwardly from the front wall, and wherein the side wall is pivotable toward the front wall to bring the first wedge-shaped segment into closer proximity with the second wedge-shaped segment and to permit the first wedge-shaped segment and the second wedge-shaped segment to be folded behind the front wall when the bedliner is inserted within a truck bed, to be positioned between the bedliner front wall and a front wall of the truck bed.

3. A unitary thermoplastic bedliner for use in the cargo bed of a truck, the bedliner comprising:

a bottom wall;

a front wall which extends upwardly from the bottom wall, the front wall having an upper edge;

a first side wall which extends upwardly from the bottom wall, the first side wall having an upper edge;

a first wheel well cover which extends from the first side wall to the bottom wall, the first wheel well cover extending from a position elevated on the first side wall to a position on the bottom wall spaced inwardly from the first side wall, the first wheel well cover assisting in maintaining the first side wall in an upright orientation with respect to the bottom wall;

a second side wall which is spaced approximately parallel to the first side wall, the second side wall having an upper edge, the front wall being positioned between the first side wall and the second side wall;

a second wheel well cover which extends from the second side wall to the bottom wall, the second wheel well cover extending from a position elevated on the second side wall to a position on the bottom wall spaced inwardly from the second side wall, the second wheel well cover assisting in maintaining the second side wall in an upright orientation with respect to the bottom wall;

portions of the front wall which define two vertically extending slots which extend below the level of the front wall upper edge, one slot being positioned between portions of the front wall and the first side wall and one slot being positioned between the portions of the front wall and the second side wall, such that the first side wall upper edge is not continuous with the front wall upper edge, and the second side wall upper edge is not continuous with the front wall, the first side wall and the second side wall thereby defining portions which are bendable outwardly from the front wall, thereby permitting increased nestability of one bedliner within a like bedliner, and wherein the slots extend upwardly along the front wall, and wherein each slot has a front tab which extends frontwardly from the front wall and a side tab which extends parallel to the front tab.

4. A thermoplastic truck bedliner for use in the cargo bed of a truck comprising:

a bottom wall;

a front wall which extends upwardly from the bottom wall;

a first side wall which extends upwardly from the bottom wall;

a second side wall which is spaced from the first side wall, the front wall being positioned between the first side wall and the second side wall;

portions defining a front tab which extends sidewardly from the front wall;

a side tab which extends from a side wall substantially parallel to the front tab, wherein a slot is defined between the side tab and the front tab, and wherein an upper portion of the side wall is defined along the side tab, the side wall upper portion being pivotable to cause the front tab and the side tab to overlap, and thereby substantially close the slot.

5. A thermoplastic truck bedliner for use in the cargo bed of a truck comprising:

a bottom wall;

a front wall which extends upwardly from the bottom wall;

a first side wall which extends upwardly from the bottom wall;

a second side wall which is spaced from the first side wall, the front wall being positioned between the first side wall and the second side wall, wherein the first side wall has a front portion which extends rearwardly from the front wall, portions of the front portion defining a front tab which extends sidewardly from the from portion, and wherein the side wall has an upper portion which has an upper edge which is spaced outwardly from the side wall front portion; and a side tab which extends from the side wall upper portion substantially parallel to the front tab, wherein a slot is defined between the side tab and the front tab, and wherein the upper portion of the side wall is pivotable to cause the front tab and the side tab to overlap, and thereby substantially close the slot.

6. The bedliner of claim 5 wherein the side wall front portion includes structure which defines a stake pocket.

7. The bedliner of claim 4 wherein the front tab is substantially coplanar with the front wall.

8. The bedliner of claim 7 wherein the side tab extends parallel to and rearwardly spaced from the front tab, the side tab extending outwardly from the upper portion of the side wall.

9. A unitary thermoplastic bedliner for use in the cargo bed of a truck, the bedliner comprising:

a bottom wall;

a front wall which extends upwardly from the bottom wall, the front wall having an upper edge;

a first side wall which extends upwardly from the bottom wall, the first side wall having an upper edge, wherein the first side wall has a lower portion which is joined to the front wall to form a first rigid corner;

a first flexure point defined as the highest portion of the first rigid corner;

a first upper portion extending from the first side wall lower portion, wherein the first upper portion is that portion of the first side wall which extends above the first flexure point, the first upper portion defining a first hinge line substantially parallel with the bottom wall and passing approximately through the first flexure point, the first upper portion being pivotable about the first hinge line with respect to the front wall;

a second side wall which extends upwardly from the bottom wall, the second side wall having an upper edge, wherein the second side wall has a lower portion which is joined to the front wall to form a second rigid corner;

a second flexure point defined as the highest portion of the second rigid corner; and a second upper portion extending from the lower portion, wherein the second upper portion is defined as that portion of the second side wall extending above the second flexure point, the second upper portion defining a second hinge line substantially parallel with the bottom wall and passing approximately through the second flexure point, the second upper portion being pivotable about the second hinge line with respect to the front wall.

10. The bedliner of claim 9 wherein portions of the first side wall form a first wheel well cover which extends upwardly along the first side wall approximately to the first hinge line, and portions of the second side wall form a second wheel well cover which extends upwardly along the second side wall approximately to the second hinge line.

11. The bedliner of claim 9 wherein a first vertical slot is defined between portions of the first side wall upper portion, and the front wall, the first slot extending upwardly of the first flexure point, and wherein a second vertical slot is defined between portions of the second side wall upper portion and the front wall, the second slot extending upwardly of the second flexure point.

12. The bedliner of claim 11 wherein portions of the first side wall upper portion and portions of the front wall overlap when the first side wall upper portion rotates about the first hinge line; and portions of the second side wall upper portion and portions of the front wall overlap when the second side wall upper portion rotates about the second hinge line.

* * * * *